UNITED STATES PATENT OFFICE.

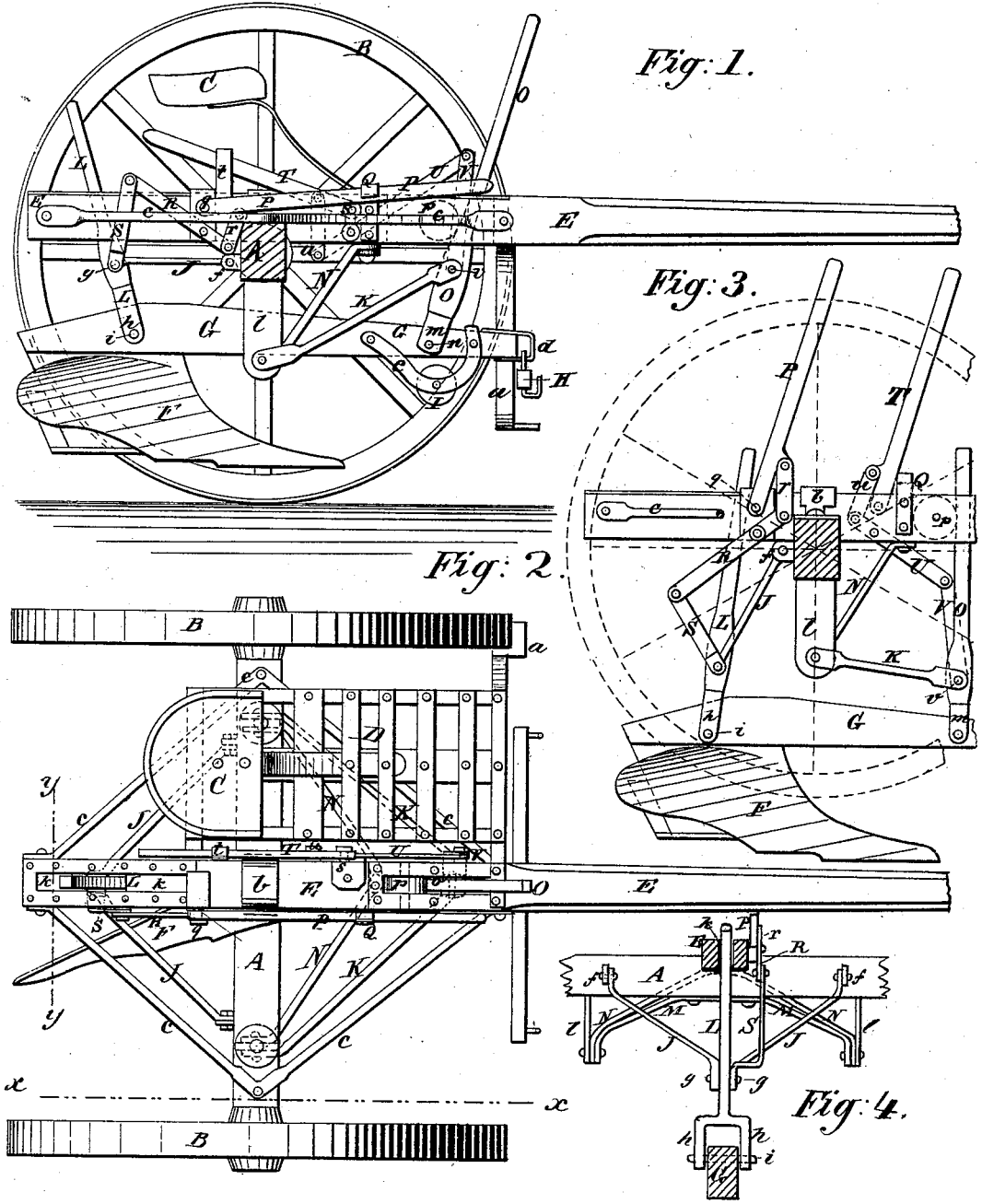

DENNIS W. PALMER, OF DETROIT, MAINE.

IMPROVEMENT IN SULKY-PLOWS.

Specification forming part of Letters Patent No. 207,674, dated September 3, 1878; application filed June 17, 1878.

*To all whom it may concern:*

Be it known that I, DENNIS WILSON PALMER, of Detroit, in the county of Somerset and State of Maine, have invented a new and Improved Sulky-Plow, of which the following is a specification:

The object of my invention is to furnish an improved device for suspending and managing a sulky-plow so that a farmer can attach and use any plow of his choice, and hitch the team to the beam of the same in the usual way, as if the plow were not attached to a vehicle, and can raise and lower the plow out of and into the ground, and give it any pitch desired.

The invention consists in the construction and combination of the various parts, as will be hereinafter described and claimed.

In the accompanying drawing, Figure 1 represents a side view of my improved sulky-plow when raised entirely out of the ground, the axle being shown in section on the line $xx$ of Fig. 2. Fig. 2 is a top view of the same. Fig. 3 is a side view, similar to Fig. 1, of the same when lowered into the ground. Fig. 4 is a detail section on the line $yy$ of Fig. 2.

Similar letters of reference indicate corresponding parts.

A is the axle of the sulky. B are the wheels. C is the seat, secured upon the platform D, which is mounted by means of the step $a$. E is the tongue, secured to the axle A by the clip $b$ and by the strengthening angular side braces $c$. F is the mold-board or plow proper. G is the plow-beam, to whose forward end the double-tree H is attached by the clevis $d$. I is a roller or gage-wheel, pivoted between vertical brackets $e$, attached to opposite sides of the beam G, in front of the mold-board F, to regulate the depth of the plow by contact with the ground.

The plow is hung to the axle A, in line with the tongue E, by the rear braces, J, and the front braces, K. The rear braces, J, are pivoted with their outer ends to lugs $f$, (attached to the rear side of the axle at a distance from the tongue, and one on each side thereof,) and their inner ends are pivoted at $g$, on opposite sides, to the bar L, whose lower end is forked or provided with a jaw, $h$, grasping the plow-beam above the mold-board, and in which jaw the plow-beam is hung by the pin $i$, on which it is free to oscillate.

The upper end of the bar L runs up through a central slot, $k$, in the tongue E, in which it is free to move vertically and longitudinally but not laterally, thus aiding the pivoted braces J to guide and steady the plow in the desired central position.

The front braces, K, are pivoted with their outer ends to lugs or standards $l$, attached at a distance from, and one on each side of, the tongue to the under side of the axle. The lugs $l$ are braced to the axle by the central brace, M, and to the tongue by the two braces N. The inner ends of the front braces, K, are pivoted on opposite sides to the bar O. The latter has a jaw, $m$, in the lower end, in which is hung, by a pin, $n$, the forward end of the plow-beam, and the upper end of the bar O runs through a central slot, $o$, in the tongue E, in the same manner and for the same purpose as the bar L in the rear slot, $k$. In the slot $o$, behind the bar O, is pivoted a friction-roller, $p$, against which the bar O works when the forward end of the plow-beam is raised to enable the team to pull the plow out of the ground.

The rear end of the plow-beam is raised and lowered, and locked in the raised position, by the second-class lever P, which is pivoted at $q$ to the side of the tongue, and locked at its limit of depression by bringing its forward or upper end into a catch, Q, on the side of the tongue.

The power and movement are transmitted from the lever P by means of the link $r$, pivoted to one end of the first-class lever R, which is fulcrumed to the side of the tongue underneath the fulcrum $q$ of the lever P, and whose other end is connected by a link, S, to the bar L at the same point, $g$, at which the rear side braces, J, are pivoted.

The front end of the plow-beam is raised and lowered, and locked in the raised position, by the second-class lever T, which is pivoted at $s$ to the side of the tongue E, and locked at its limit of depression by bringing its upper or rear end into a catch, $t$, on the side of the tongue. The power and movement are transmitted from the lever T by means of the link $u$, pivoted to one end of the first-class lever U, which is fulcrumed to the side of the tongue beneath the fulcrum s of the lever T, and whose other end is connected by a link, V, to the bar O at the same point, v, at which the front side braces, K, are pivoted.

The lever P has a throw or sweep of about ninety degrees forward of the vertical, and the lever T has a sweep of about ninety degrees rearward of the vertical, and both levers are arranged at the side of the driver's seat, one on each vertical side of the tongue E, so as to be easily accessible to handle.

To raise the plow out of the ground, the point of the plow is raised by depressing the lever T, thus giving the plow an upward inclination, which enables the horses to pull it out of the ground, after which the rear end of the plow is lifted by the lever P. If the plow strikes a root of a tree or a rock, its rear end is raised by the lever P and the horses back it out, after which the plow-point is raised by the lever T, and the obstruction cleared and passed, allowing the plow to be again dropped into the ground and the work continued.

It is evident that by this construction, if necessary, the combined weight of the sulky and the driver can be thrown on the plow to force it into the ground to the depth regulated by the gage-wheel I.

The jaws h m of the bars L O should each be made in two parts, bolted together, in order that they may be adjusted to suit different widths of plow-beams.

Having thus described my invention, I claim as new and desire to secure by Letters Patent—

The combination, with sulky and plow-beam, of the tongue E, having central slots k o, the braces J K M N, the pivoted bars L O, having jaws h m, and the link-connected levers, substantially as shown and described.

DENNIS W. PALMER.

Witnesses:
S. S. HACKETT,
G. H. WHITNEY.